July 5, 1966    J. F. MIFSUD    3,259,878
METHOD OF CONTROLLING THE SEISMIC SIGNAL IN EXPLORATION
Filed Dec. 2, 1960    3 Sheets-Sheet 1

Joseph F. Mifsud    Inventor

By John D. Gassett    Attorney

July 5, 1966 J. F. MIFSUD 3,259,878
METHOD OF CONTROLLING THE SEISMIC SIGNAL IN EXPLORATION
Filed Dec. 2. 1960 3 Sheets-Sheet 3

Joseph F. Mifsud  Inventor
By John D. Gassett  Attorney

United States Patent Office 3,259,878
Patented July 5, 1966

3,259,878
METHOD OF CONTROLLING THE SEISMIC SIGNAL IN EXPLORATION
Joseph F. Mifsud, Tulsa, Okla., assignor, by mesne assignments, to Esso Production Research Company, Houston, Tex., a corporation of Delaware
Filed Dec. 2, 1960, Ser. No. 73,253
7 Claims. (Cl. 340—15.5)

This invention relates generally to the art of geophysical exploration using artificially induced seismic waves. It is particularly concerned with a system for generating successively a series of seismic signals such that the addition of the frequency spectra of all of the seismic signals gives in effect essentially the frequency spectrum desired for seismic exploration.

Geophysical prospecting using artificially induced seismic disturbances has found wide application in the search for petroleum and other products. It is the general practice to initiate a seismic disturbance at a point near the surface of the earth. Part of the seismic waves generated travel downward within the earth until they encounter discontinuities in the earth's structure in the form of various substrata formations and the like. These discontinuities have the effect of reflecting a portion of the seismic waves back toward the surface of the earth. By arranging a plurality of geophones or other seismic transducers at spaced distances from the seismic source, it is possible to detect the arrival of the reflected seismic waves at the surface of the earth. These detected waves are translated into electrical signals which are indicative of the character of the ground motion and are usually referred to collectively as a reflection signal or seismogram which is in effect to a composite signal made up of a plurality of electrical signals varying in frequency and amplitude.

The artificially induced seismic disturbance has been most frequently produced by initiating a dynamite explosion in a shot hole drilled in the surface of the earth. This has certain drawbacks, including the hazard of handling dynamite, the cost of dynamite and the cost of drilling the shot holes. Recently, interest has been shown in the industry in mechanical type seismic sources. One such mechanical system consists simply of raising a large mass several feet above the surface of the earth and dropping it. The force with which the weight strikes the earth induces the seismic disturbance. This system, although having some merit, has the disadvantage of being difficult to transport because of its great weight. The methods of generating seismic waves by detonating an explosion or dropping a weight are both effective but the operator has almost no control over the shape of the downtraveling elastic pulse. In other words, there is practically no control over the phase or amplitude of the various frequency components which make up the downtraveling pulse. It is also significant that the shape of the downtraveling pulse is not the same from shot hole to shot hole or from one drop of the weight to the next. These differences are largely due to the change of coupling of the seismic cource with the earth from one location to the other. The change of coupling may be due to a difference of elastic properties of the earth from one place to another, or to a change in the area or configuration of the contact between the source and the earth material. These problems are for the most part largely eliminated by the use of the system of the present invention which is disclosed herein.

Briefly, in a preferred form the invention is a system of seismic exploration in which the desired effective downtraveling signal is a composite signal and is obtained from a series of elementary signals, each elementary signal having a rather narrow bandwidth. Each elementary signal is an elastic wave and can consist of a pulsed sine wave; that is, a sinusoidal wave of finite duration. The elementary signals are generated at a point near the earth's surface and are reflected from subsurface strata. The center frequencies or carrier frequencies of elementary signals normally are different and are spaced more or less uniformly in the desired frequency spectrum of the effective downtraveling signal. The reflection of each elementary signal from subsurface strata is detected and recorded independently. Thereafter the recorded reflected signals of all the elementary signals are added together with the proper relative phase and amplitude to form an effective or composite reflected signal or seismogram. Preferably the effective or composite downtraveling signal is obtained by adding the elementary signals in proper relative phase and amplitude to give the desired waveform. In most cases it is more practical to record the elementary signals and then decide what relative phase and amplitude changes are necessary to obtain the desired effective downtraveling signal. The relative phase and amplitude of the received signals are then adjusted in the same relationship.

The synthesized reflection seismograms at several geophone stations (with vibrator location approximately fixed) or at one geophone station (with several vibrator locations) can be displayed in any conventional manner such as in a side-by-side relationship to form a seismic section which approximates a cross-sectional view of the earth through which the signals were propagated. The composite reflection signals can also be operated upon or processed in any conventional manner.

The objects of and a better understanding thereof of the invention may be had from the following description taken in conjunction with the drawings in which.

Figure 1:
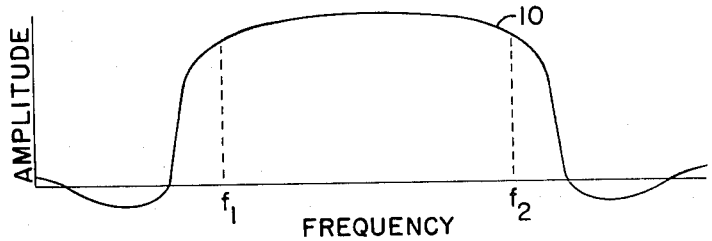
FIG. 1 represents a typical selected seismic wave frequency spectrum.

In the practice of this invention, the total frequency bandwidth is selected which is necessary to obtain proper resolution for the area under exploration. The resolution required is determined by the thickness of the suspected layers of subsurface strata. This total bandwidth can be determined by one skilled in the art in a known manner. In general, it can be said that the thinner the subsurface interval which is desired to be detected, the broader the bandwidth must be. A typical desired frequency spectrum for the effective downtraveling signal is illustrated in FIG. 1 in which $f_1$ is equal to approximately 20 cycles per second and $f_2$ is equal to 80 cycles per second. This frequency range, of course, varies for different areas. It is also understood that the shape of the frequency spectrum may be varied as desired.

Figure 2:
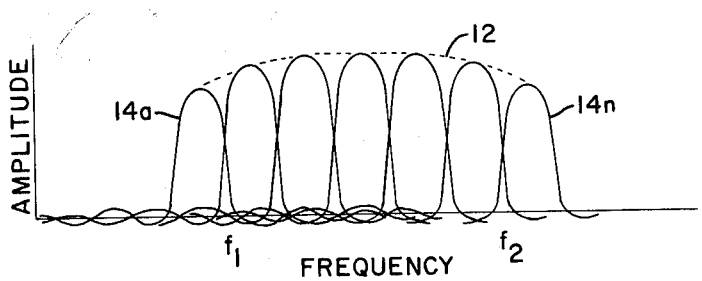
FIG. 2 represents the frequency spectrum of FIG. 1 broken down into several parts.

FIG. 2 illustrates a group of elementary frequency spectra which when added together has a summation line 12 which is the same or approximates the curve 10 in FIG. 1. It is preferred to make each elementary spectrum 14a through 14n as sharp as practical in order to get good signal-to-noise ratio and to simplify the transmitting and receiving equipment. In fact, in the ideal case the width of each elementary spectrum is approximately one cycle per second.

Figure 3:
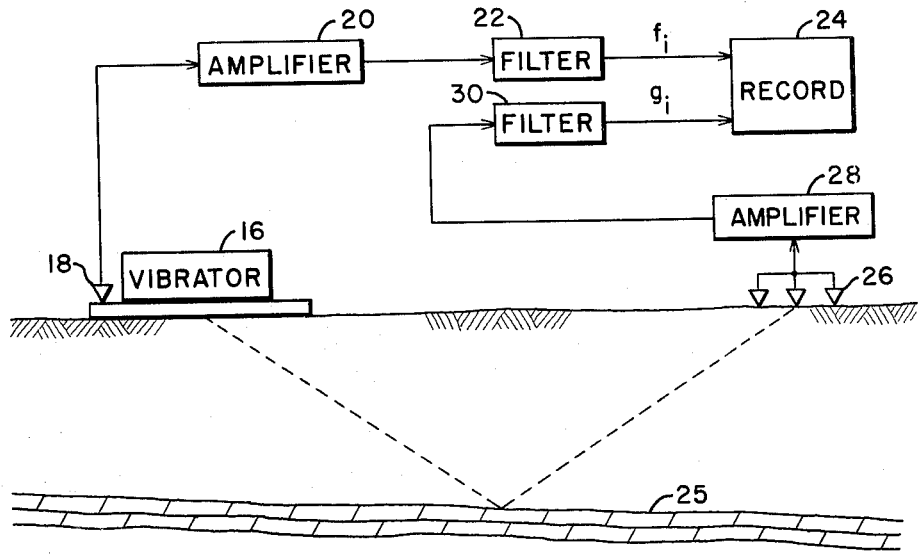
FIG. 3 illustrates by block diagram one means of obtaining the signals illustrated in FIG. 4.
Figure 4:
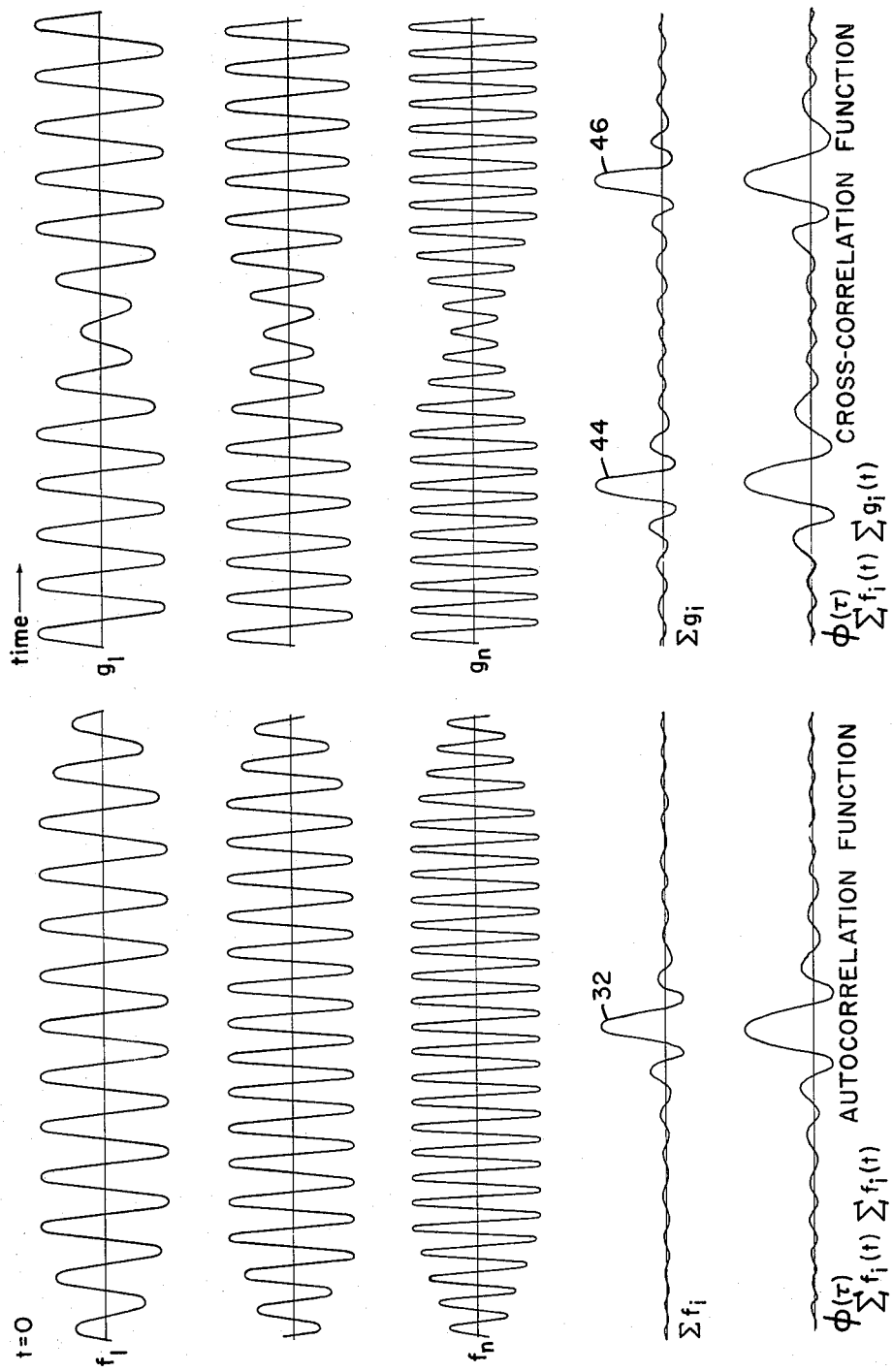
FIG. 4 illustrates typical transmitted elementary seismic signals according to this invention and their summation; the received reflection signals and their summation; the autocorrelation of the summation transmitted signal and the cross-correlation of the summation transmitted signal and the summation received signal.

FIG. 3 illustrates means for generating the input signals $f_1$ to $f_n$ and for detecting the output or reflected signals $g_1$ to $g_n$ shown in FIG. 4. Illustrated thereon are vibrator 16 which is of a character to transmit into the earth an elementary seismic signal having a frequency spectrum 14a, for example, as illustrated in FIG. 2. The vibrator should be capable of generating signals having frequency spectrum corresponding to each of the elementary frequency spectrum 14a through 14n as discussed above in relation to FIG. 2. Vibrator 16 may, for example, be a pair of eccentrically mounted counter rotating weights in which the speed of rotation of the weights and the length of the radius arm of the offset weights may be varied to obtain the desired seismic signal. Such apparatus for producing an earth input signal having a controlled frequency spectrum is manufactured by L.A.B. Corporation, Skaneateles, New York.

Located on the radiating plate or base of the vibrator 16 is a geophone or other seismic transducer 18 to detect the earth input signal which is represented in FIG. 4 as $f_i$. The signal $f_i$ is passed through amplifer 20, filter 22 and to recorder 24. Filter 22 is used primarily to eliminate the extraneous noise and is normally set to pass a bandwidth approximately equal to the bandwidth that vibrator 16 is transmitting to the earth. Located remote from vibrator 16 are geophones 26 which are of the character to detect ground motion and convert it into electrical signals. Geophones 26 may be arranged in any known array to improve the reception of the desired reflections such as from reflection interface 25, for example. The output of geophones 26 is passed to amplifier 28 and the output of amplifier 28 is passed through filter 30 which is preferably identical to filter 22. The output of filter 30 is recorded and is represented in FIG. 4 as $g_i$. Recording means 24 may be any convenient recording means in which the signal recorded thereon is readily reproduced. A most common means for record 24 is magnetic tape using a plurality of recording heads. In such case there is a separate channel on the magnetic tape for each of the signals $f_1$ and $g_1$ corresponding to each of the elementary frequency spectra 14a through 14n. Suitable multiple channel magnetic recorders and the method of operating them are well known in the art.

In operation, the apparatus in FIG. 3 is adjusted so that vibrator 16 successively transmits into the earth, signals $f_1$ through $f_n$ as illustrated in FIG. 4 which are sufficient to approximate the desired frequency spectra. When the transmitted signals $f_1$ through $f_n$ are added, when properly adjusted in time, it will give a summation waveform $\Sigma f_i$ which has a short duration with a sharp peak as illustrated at 32. The amplitude and relative phase of the transmitted signals $f_1$ through $f_n$ are adjusted to give a sharp peak or spike 32 as may be desired. These adjustments are relatively easy to perform.

Figure 5:
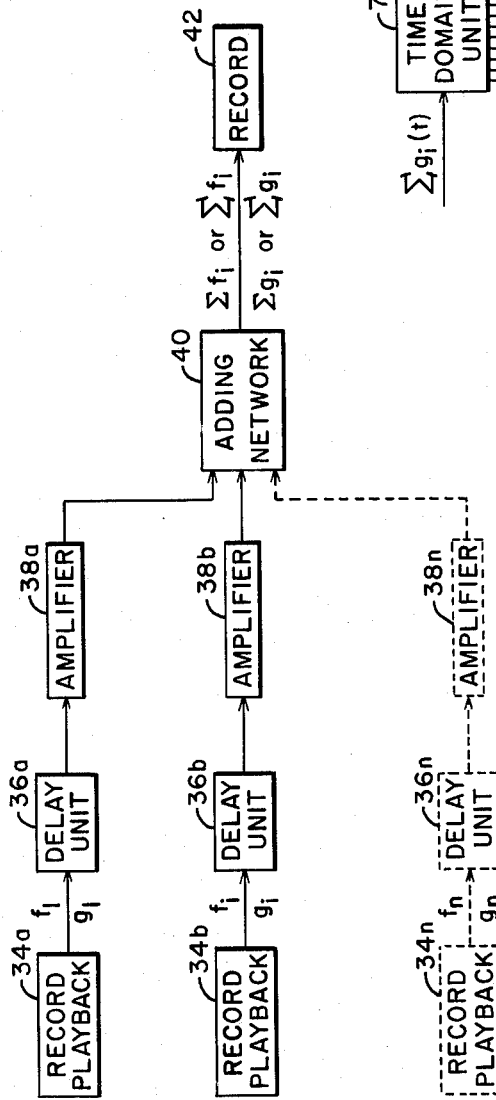
FIG. 5 represents in simplified diagram form means for adding the transmitted signals and the detected reflected signals of FIG. 4.

Turning now to FIG. 5 there is illustrated a means for adding the output signals $f_i$ in a manner to obtain a desired peak 32 of the summed signal. Illustrated on FIG. 5 is record playback equipment 34a through 34n for reproducing the information stored on record 24 of FIG. 3 for example. The outputs of playback equipment 34a through 34n are connected respectively to delay units 36a through 36n. The delay units are of a character to delay the signal for a variable time ranging from zero delay to any desired delay which may be as much as half a second or more. The outputs of delay units 36a through 36n are electrically connected to amplifiers 38a through 38n, respectively. The amplifiers are adjustable to any gain desired. The outputs of the amplifiers 38a through 38n are fed to adding network 40. The output of adding network 40 is electrically connected to a recording means or other display means 42.

The apparatus shown in FIG. 5 is used to add the input signals $f_1$ to $f_n$. Each earth input $f_1$ to $f_n$ may be reproduced by record playback means 34a through 34n respectively. Record playback means 34a is preferably means for reproducing stored information from magnetic tape. The signals $f_1$ through $f_n$ are reproduced simultaneously and added through adding network 40 and stored on record means 42 which can be displayed either on photographic paper or on the face of an oscilloscope. It is preferred that it be displayed upon the face of an oscilloscope so that the effects of changing the delay or the amplitude of any signal can be readily and quickly observed. If necessary the delay of the various signals may be adjusted by delay units 36a through 36n and the amplitude can be varied by their respective amplifiers. The delays and amplitudes are varied for each signal if necessary to obtain a summation signal which has a sharp peak such as 32 shown in FIG. 4.

The generation, transmission and reception of a seismic signal is conventionally described by a linear system. Then in order to obtain the seismogram or received signal for the effective or summed signal, the same phase delay and same amplitude variation is required in $g_1$ through $g_n$ as in $f_1$ through $f_n$ respectively. The same or similar apparatus shown in FIG. 5 is used to produce the summation or synthesized effective received signal $\Sigma g_i$ shown in FIG. 4 having reflection events 44 and 46. The same delay setting and amplification setting, if any, required for input signals $f_1$ to $f_n$ to produce the desired summation transmitted waveform are used with received or ground output signals $g_1$ through $g_n$, respectively.

The earth input signals $f_1$ through $f_n$ may vary in duration from as low as a fraction of a second to as high as several seconds. If desired, the input signal may last long enough until essentially steady state condition exists. That is, for all practical purposes the wave being produced has a bandwidth which is less than one cycle per second wide.

In general, it can be said that the sharper or narrower the elementary spectrum 14a, the better the signal-to-noise ratio at the receiving point. This is most effectively accomplished when the transmitted signal has for all practical purposes reached the steady state condition. By making the elementary spectrum sharp as by reaching the steady state, the efficiency of the vibrator and the coupling of the vibrator to the earth can also be improved. By improving the efficiency of the vibrator and the vibrator-ground coupling a smaller and less expensive vibrator can be used. Convenience of handling of a small vibrator is a big asset.

The driving-point impedance of the ground can be represented as a mass and a spring in the seismic frequencies. Therefore by adjusting the area and mass of the driving piston, i.e., the base of vibrator 16, the mechanical system comprising the mass of the piston and the driving-point impedance can be made to resonate at any particular frequency.

Theoretically it would require an infinite number of single frequency components to obtain the continuous spectrum curve 10. However, for all practical purposes it has been found that by adding steady state signals one cycle apart the effective bandwidth will approach the frequency spectrum 10. For example, if $f_1$ and $f_2$ are 20 and 80 c.p.s. respectively then 61 sine waves one cycle apart would define for all practical purposes the desired frequency spectrum.

As the bandwidth of the elementary signal is made small, the signal has a long duration or approaches steady state. For long duration seismic signals the very weak deep reflection signals and the strong, surface and near surface, signals are detected at the same time. This means then that the receiving system, recording system and data processing system should have a large dynamic range to accommodate the wide range of signal amplitudes present. Consequently an upper range on the duration of the transmitted signal is dictated by the maximum available dynamic range.

There are various ways of generating the earth input signals $f_1$ to $f_n$. For example, two balance flywheels may be attached to the same rigid frame with their plane of rotation the same and made to rotate in opposite directions. If the balance on a side of each flywheel is moved radially out and back during rotation and the phase of rotation of each flywheel is adjusted so that horizontal forces cancel, only vertical forces are generated and the two flywheels are a pulsed sine wave force generator.

In order to speed up the above summation method of seismic prospecting several vibrators can be used simultaneously. For example, the transmitting frequency of the various vibrators initially may be 20 c.p.s., 30 c.p.s., 40 c.p.s., 50 c.p.s., 60 c.p.s. and 70 c.p.s. The next group of frequencies generated could be 21 c.p.s., 31 c.p.s., 41 c.p.s., 51 c.p.s. and 61 c.p.s. Thus, in this case the seismic frequency band of interest 20–80 c.p.s. can be covered six times faster than when only one vibrator is used. If the relative phase and amplitude of the several vibrators can be adjusted at the various vibrators then the desired received signal is simply the sum of the received signals for all transmissions of the group of vibrators. However, if it is difficult to properly adjust the relative phase and amplitude of the transmitted signals at the vibrators, then in order to improve the signal-to-noise of the overall detection systems it may be necessary to detect the different reflected frequency components by use of a plurality of sharply tuned filters. In such a case a filter is provided for each frequency generated and separates that reflected component from the other reflected components. Then the relative phase and amplitude of the different frequency components can be adjusted as described above for the single vibrator.

When the narrow band elementary transmitted signals are at least a second or so long then the above method of processing the field data by simple addition is preferred. Here the proper relative phase, which is zero phase, is easy to obtain and the addition has a simple peaked waveform. However, for pulsed signals less than a second long another or alternate method of processing the field data is of particular advantage.

In the alternate method of data processing, which can be used for any duration signal, the ground input signals $f_1$ illustrated in FIG. 4 are added together so that they approximately overlap in time. In the addition in this system there is no critical adjustment of relative phase of the $f_1$ signals. The $g_1$ received signals are added with the same relative phase as their $f_1$ transmitted signals when added. These summations can be obtained on the equipment shown in FIG. 5 previously described. Then the sum of the transmitted signals $\Sigma f_i$ is cross-correlated with the sum of the received signals $\Sigma g_i$.

Hence the cross-correlation $$\phi(\tau)_{\Sigma f_i(t)\Sigma g_i(t)} = \frac{1}{2T}\int_{-T}^{T}[h(t-\tau)][k(t)]dt$$

where $h(t)=\Sigma f_i(t)$, $k(t)=\Sigma g_i(t)$, $\tau$ is the delay between $h(t)$ and $k(t)$, and $2T$ is the duration of $h(t)$.

The above correlation scheme will essentially accomplish the same purpose as the summation method described previously (see FIG. 4) and yet the adjustment of the relative phase of the $f_1$ signals and the relative phase of the $g_1$ signals before summation need not be critical.

Figure 7:
FIG. 7 illustrates another means of processing the detected reflected signals of the elementary seismic waves.
Figure 6:
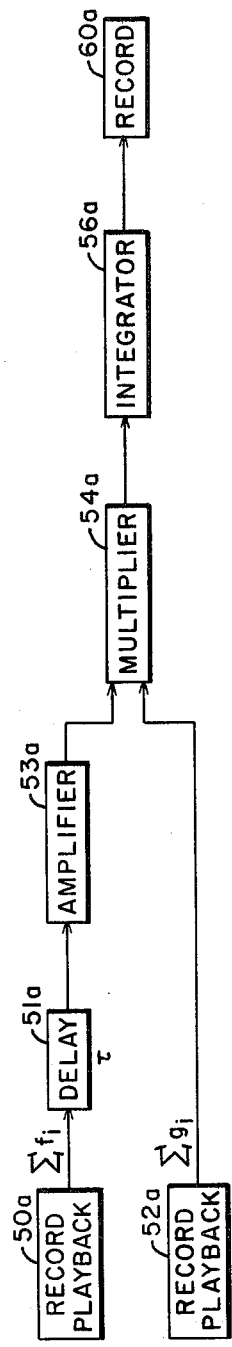
FIG. 6 illustrates another means of processing the detected reflected signals of the elementary seismic waves.

Apparatus for correlating the ground input summation signal $\Sigma f_i$ with the ground output summation signal $\Sigma g_i$ are shown in FIG. 6 and FIG. 7. In FIG. 6 there is illustrated a means 50a for playing back a record of $\Sigma f_i$. Also illustrated is record playback equipment 52a which is capable of reproducing the summation of the reflected signals $\Sigma g_i$ such as stored on record 42. Both 50a and 52a may be magnetic tape playback equipment. The output of 50a is connected to a delay unit 51a which in turn is connected to amplifier 53a. The output of amplifier 53a is multiplied by the output of 52a in the multiplier 54a. The product of multiplier 54a is fed to integrator 56a and recorded by 60a. The recording means 60a normally takes the form of a reproducible means such as magnetic tape so that the integrated signal can be reproduced. Additional similar equipment can be used so that the above operations are performed simultaneously for a large number of geophone stations or for various locations of the vibrator.

The summation signals $\Sigma f_i$ and $\Sigma g_i$ are multiplied for zero delay, as an initial value of $\tau$, and this product is integrated or summed to give the initial value of the final reflection seismogram. The delay $\tau$ is then increased in incremental steps and the multiplication and integration is repeated at each step. Thus, the final reflection signal or seismogram will comprise a series of values of $\phi(\tau)$ for increasing values of delay $\tau$. In FIG. 6 $\Sigma f_i$ and $\Sigma g_i$ will be played back once for every choice of $\tau$ or delay time.

Another way of effecting correlation is shown in FIG. 7. Illustrated thereon is time domain unit 70a whose output is connected to recording and reproducing means 72a. The summation reflected signal $\Sigma g_i$ is fed to a time domain unit which has been programmed to weigh the signal $\Sigma g_i$ in accordance with the summation earth input signal $\Sigma f_i$. A suitable time domain unit and means of programming the unit is set forth in the copending application of W. L. Ikard, Serial No. 817,408, filed June 1, 1959, and assigned to the same assignee as this application. In operation of the apparatus in FIG. 6 the output of the time domain unit can be recorded and then reproduced by recording and reproducing means 72a which is conveniently magnetic tape with recording and reproducing means associated therewith.

In the discussion above, the ground vibrator can be moved from one near location to another and the same series of signals transmitted at each location. All the transmitted signals are added and all the received signals are added. The added signals can then be processed by any of the systems described above. This will improve the directionality of the source, eliminate part of the surface wave transmitted and improve the signal-to-noise of the overall detection system. Rather than use only one vibrator, many vibrators at different near locations can be used simultaneously to speed up the process.

When the alternate method (i.e., the correlation system) of processing the seismic signals is used with several vibrators transmitting simultaneously at different frequencies it is not necessary to adjust critically the relative phase of the various vibrators. The desired effective down traveling signal is the sum of all the received signals for all of the transmissions by the group of vibrators.

While there are above disclosed but a limited number of embodiments of the process and system of the invention herein presented, it is possible to produce still other embodiments without departing from the inventive concept herein disclosed. It is therefore desired that only such limitations be imposed on the appending claims as are stated therein.

What is claimed is:

1. A method for obtaining a composite reflected seismic signal having a preselected frequency spectrum which comprises: generating narrow bandwith seismic waveforms at a point near the earth's surface, each of said waveforms having a different center frequency within the desired spectrum; detecting and recording independently reflections of each seismic waveform; and thereafter combining the recorded reflected signals of each frequency component thereby forming in effect a composite reflected seismic signal having a selected frequency spectrum.

2. A method as defined in claim 1 in which the narrow bandwidth seismic waveforms are generated successively.

3. A method of seismic prospecting in which the down-traveling signal has a selected frequency spectrum which includes:
   (a) generating a single constant frequency elastic signal near the surface of the earth and of sufficient magnitude to penetrate the earth and then be reflected by subsurface strata;
   (b) recording said transmitted signal;
   (c) detecting the signals reflected from subsurface strata at a point remote from the point of transmission of the elastic seismic waveform;
   (d) recording the detected signal;
   (e) repeating steps (a), (b), (c) and (d) above for each of the different frequency components of the desired frequency spectrum;
   (f) reproducing the recorded transmitted signals to obtain reproduced transmitted signals;
   (g) adjusting the amplitude and relative phase of the reproduced transmitted signals so that these signals, when added, give a signal having the selected frequency spectrum;
   (h) reproducing the recorded detected signals to obtain reproduced detected signals;
   (i) applying the same amplitude and relative phase changes to the reproduced detected signals as were applied to the reproduced transmitted reflected signals in step (g);
   (j) adding such adjusted reproduced detected signals to produce a composite reflected signal.

4. A method of seismic exploration in which the seismic waveform has a preselected frequency spectrum which comprises: generating successive bursts of seismic energy at a point near the surface of the earth, the sum of the frequency spectra of all the successive seismic bursts of energy generated approximating the preselected frequency spectrum; detecting and recording at a location remote from said point independently reflections of each burst of energy; and thereafter adding from a common reference point the recorded reflected signals of each burst of energy to thereby form in effect a composite reflected seismic signal.

5. A method for obtaining a composite reflected seismic signal having a selected frequency spectrum which comprises: generating a single frequency seismic waveform at a point near the earth's surface; detecting energy returned to the earth's surface from subsurface formations in response to said seismic wave; recording a signal representative of the detected energy; initiating additional single frequency seismic waveforms, said additional waveforms having different frequencies within the selected frequency spectrum and being sufficient in number and spacing to define said frequency spectrum; detecting energy returned to the earth's surface from subsurface strata in response to the additional waveforms; recording the signals representative of the energy received from the additional seismic waveforms; and adding the recorded signals.

6. A method of seismic exploration in which it is desired to have a seismic waveform with a selected frequency spectrum which comprises: generating successive bursts of seismic energy at a point near the surface of the earth, the sum of the frequency spectra of all the successive seismic bursts of energy generated approximating the selected frequency spectrum; detecting the reflections of each burst; adding all the generated seismic waveform to obtain one sum; adding the detected reflections of each burst of energy with the same relative phase as their source bursts, and then correlating the sum of the generated signals with the sum of the reflected signals.

7. A method for obtaining a composite seismic signal from an effective seismic disturbance having a selected frequency spectrum which comprises: generating successive single frequency seismic waveforms at a point near the earth's surface, each of said waveforms having a different frequency and being adequate in number and spacing to define the selected spectrum; detecting the reflection of each seismic waveform; adding all the generated seismic waveforms to obtain one sum, adding all the detected reflected signals to obtain another sum and correlating one sum by the other to obtain a correlation reflected signal of a wide band seismic signal having a selected frequency spectrum.

References Cited by the Examiner

UNITED STATES PATENTS

| | | | |
|---|---|---|---|
| 2,364,209 | 12/1944 | Green | 181—.5 |
| 2,675,086 | 4/1954 | Clewell | 181—.5 |
| 2,688,124 | 8/1954 | Doty et al. | 340—15.5 |
| 2,794,965 | 6/1957 | Yost | 181—.5 X |
| 2,808,577 | 10/1957 | Crawford et al. | 181—.5 X |
| 2,894,245 | 7/1959 | Johnson | 181—.5 X |
| 2,896,162 | 7/1959 | Berger | 235—181 X |
| 2,902,107 | 9/1959 | Erath et al. | 181—.5 |
| 3,066,754 | 12/1962 | Johnson | 181—.5 |

BENJAMIN A. BORCHELT, *Primary Examiner.*

CHARLES W. ROBINSON, CHESTER L. JUSTUS, SAMUEL FEINBERG, *Examiners.*

A. S. ALPERT, V. J. DI PIETRO, R. M. SKOLNIK,
*Assistant Examiners.*